May 6, 1952 W. T. GRAHAM 2,595,351
ADJUSTABLE WEED CUTTING ATTACHMENT
Filed May 5, 1947 3 Sheets-Sheet 1
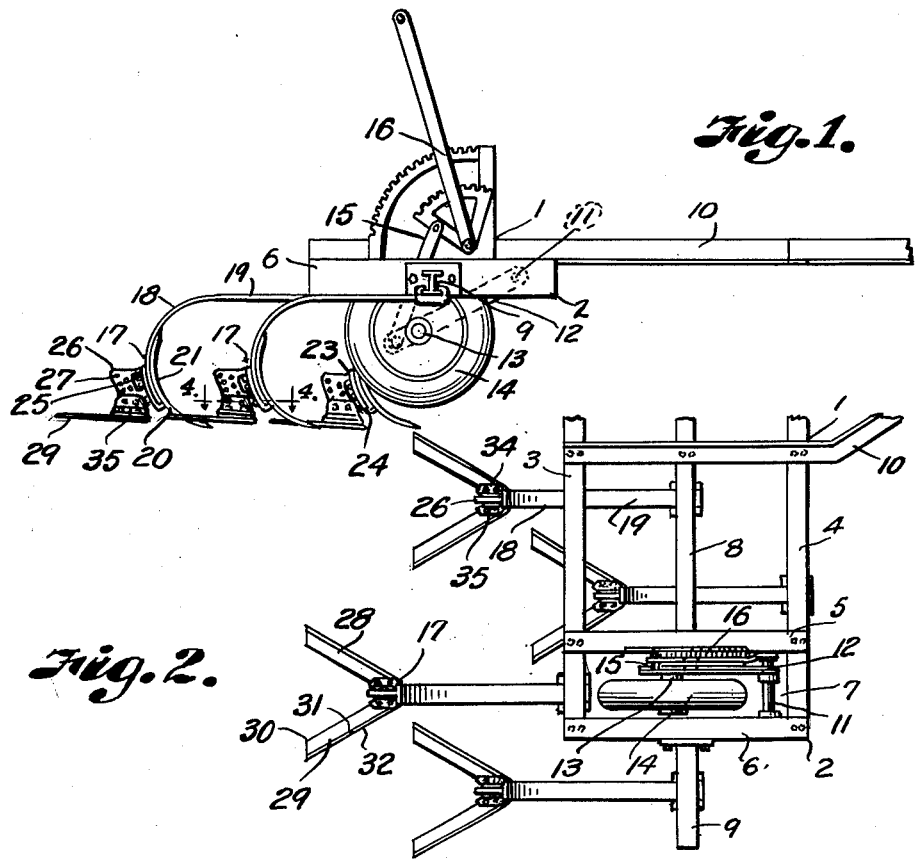
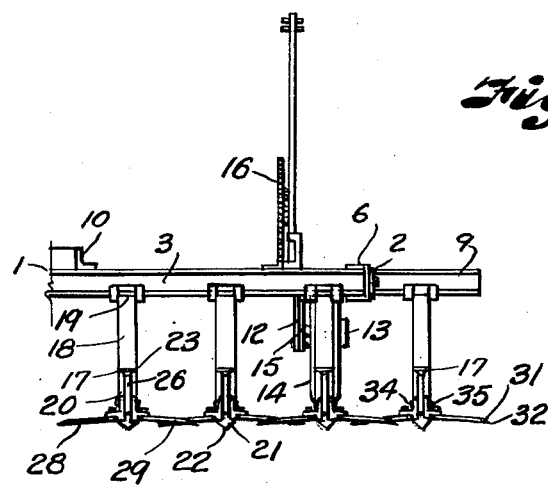
Inventor
William T. Graham,
By
Fishburn & Mullendore
Attorneys May 6, 1952     W. T. GRAHAM     2,595,351
ADJUSTABLE WEED CUTTING ATTACHMENT
Filed May 5, 1947     3 Sheets-Sheet 2
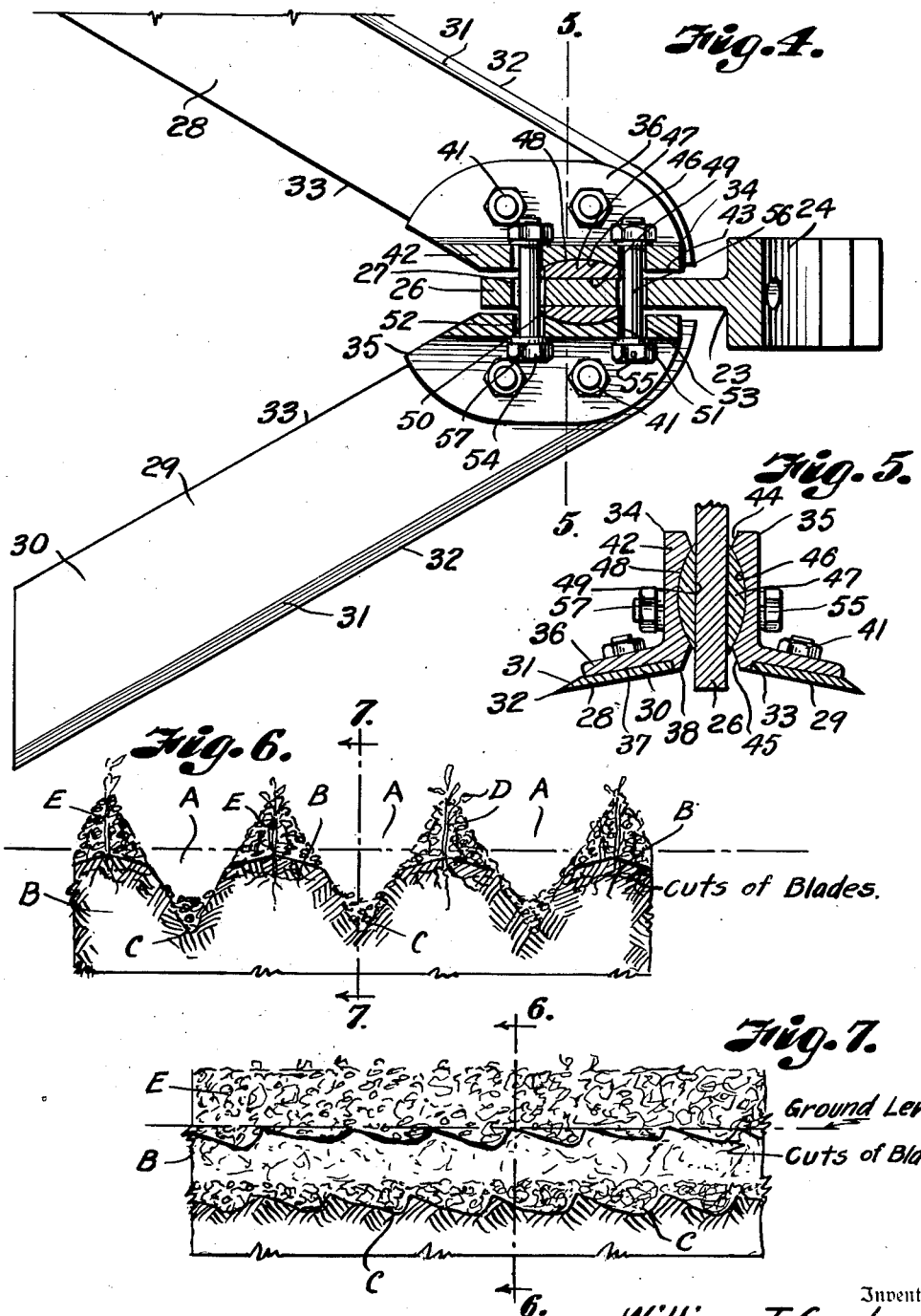

May 6, 1952 W. T. GRAHAM 2,595,351
ADJUSTABLE WEED CUTTING ATTACHMENT
Filed May 5, 1947 3 Sheets-Sheet 3

Inventor
William T. Graham.
By Fishburn & Mullendore
Attorneys

Patented May 6, 1952

2,595,351

UNITED STATES PATENT OFFICE 2,595,351

ADJUSTABLE WEED CUTTING ATTACHMENT

William T. Graham, Amarillo, Tex.

Application May 5, 1947, Serial No. 745,914

3 Claims. (Cl. 97—207)

This invention relates to plows of a type including a plurality of laterally arranged ground conditioning tools that work under the surface to heave and break the soil and form alternate ridges and furrows having exposed surfaces composed of clods, straw and other mulching material occurring on a field.

The ground prepared by plows of this character is in satisfactory condition to conserve moisture and retard soil erosion but since the original surface of the ground between the furrows is left undisturbed, the weeds are merely covered by the loose material displaced from the furrows with the result that they continue to grow. Another difficulty with such plows is that the loose materials in the top of the ridges act to conduct moisture from the furrows through the capillaries in the ridges.

The weed difficulty is overcome to a substantial degree with the weed cutting attachments as disclosed in United States Letters Patent No. 2,333,371, issued to me on November 2, 1943, since the knives of the attachments cut through the tops of the ridges and under the loose material thereon to sever the weed stems above the roots but the knives produce a dragging cut across the weeds and do not assure complete severance of the stem from the roots. The knives of the patent being substantially flat also interfere with the resilient or pumping action of the tools which is necessary to form water pockets in the furrows and to pack and seal off the capillaries and to lessen the draft or pull of the plow.

It is, therefore, a principal object of the present invention to provide a weed cutting attachment that overcomes the above mentioned difficulties of the patented attachment.

Other objects of the invention are to provide for support of the blades at an inclined angle or pitch in both transverse and longitudinal directions; and to provide an adjustable and universal mounting by which the angle and pitch of the blades may be changed to give the desired action.

A further object of the invention is to provide a knife arrangement wherein the pumping action of the tools produces a forward and downward chopping on the weeds.

A further object of the invention is to provide a knife mounting which results in cutting off and sealing of the capillaries of the ridges and the formation of a water shed on the top of each ridge to drain the moisture into the furrows at the respective sides of the ridges.

A further object of the invention is to provide a knife arrangement which is adjustable to cut the larger weeds, the smaller weeds with the roots above the cutting plane are shaken loose from the dirt and thereby killed.

Another object of the invention is to provide a knife arrangement which adjusts to govern throw of the dirt.

In accomplishing these and other objects of the invention hereinafter pointed out, I have provided improved structure, the preferred form of which is illustrated in the accompanying drawings wherein:

Fig. 1 is a side elevational view of a plow equipped with ground working and weed cutting devices embodying the features of the present invention.

Fig. 2 is a plan view of one end of the plow showing the arrangement of ground working tools and weed cutting devices associated therewith.

Fig. 3 is a rear view of the portion of the plow shown in Fig. 2.

Fig. 4 is an enlarged horizontal section through one of the weed cutting devices taken on the line 4—4 of Fig. 1.

Fig. 5 is a detail section on the line 5—5 of Fig. 4 particularly illustrating the universal mounting of the weed cutting blades.

Fig. 6 is a diagrammatic sectional view showing the furrows and ridges formed by the plow and the cuts produced by the weed cutting blades, the section being taken on the line 6—6 of Fig. 7.

Fig. 7 is a longitudinal section through one of the furrows illustrating the pockets formed in the ridges that are produced by the weed cutting blades, the section being taken on the line 7—7 of Fig. 6.

Figure 8:
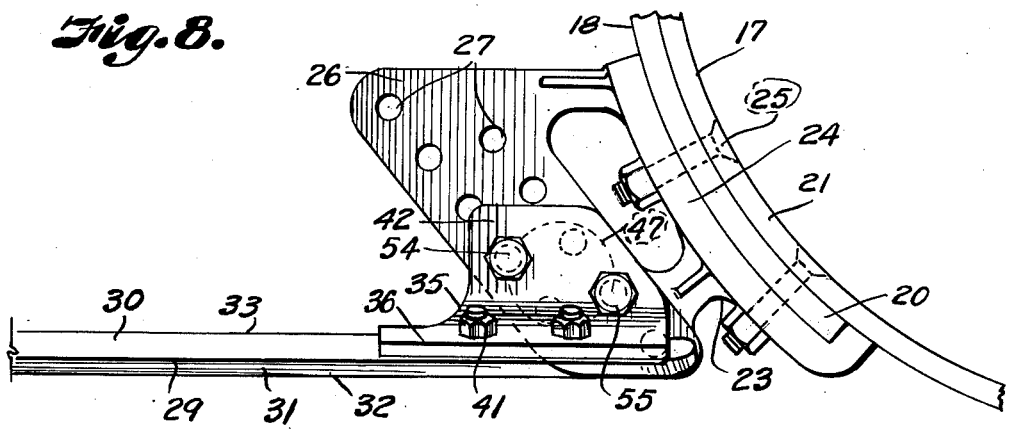
Fig. 8 is an enlarged side elevational view of the mounting bracket and the cutting blades and particularly illustrating apertures in the mounting bracket for positioning the cutting blades at different elevations.
Figure 9:
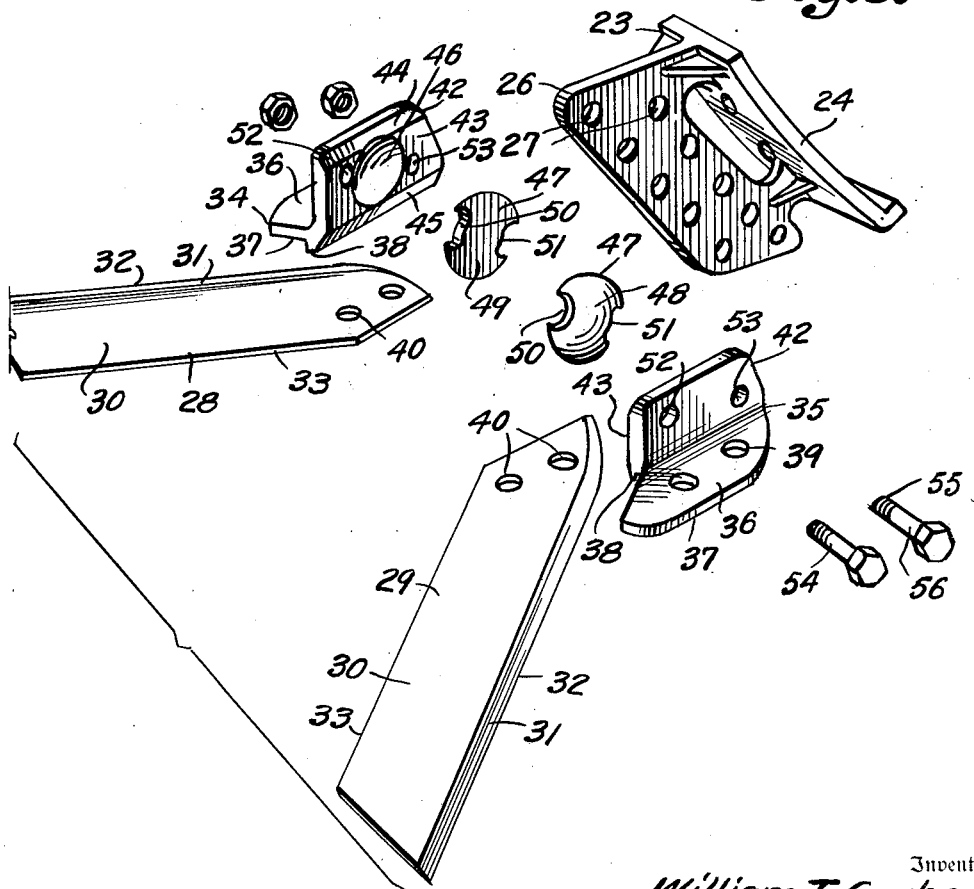
Fig. 9 is a perspective view of the parts of the weed cutting devices and mounting brackets shown in disassembled spaced relation.

Referring more in detail to the drawings:

1 designates a plow embodying the features of the present invention and which includes a frame 2 composed of transverse beam members 3 and 4 spaced apart at the ends thereof by pairs of longitudinal members 5 and 6 and which provide wheel pockets 7. The frame also includes an intermediate transverse beam 8 and an extension 9 projecting from the endmost beam 6. Extending across the transverse beams and slidably connected therewith is a tongue 10 adapted to be connected to the draftbar of a tractor (not shown).

Extending transversely of the forward ends of the wheel pockets are shafts 11 carrying arms 12 having wheel spindles 13 for journalling wheels 14. The frame 2 is raised and lowered with respect to the wheels through links 15 that connect rear ends of the arms with lever mechanisms 16 whereby the ground working devices hereinafter described may be moved into and out of ground working position.

The ground working devices 17 are carried by the transverse beams 3, 4 and 8 and extensions 9 at spaced intervals along the length thereof and in staggered relation to form a plurality of furrows A and intermediate ridges B when the plow is in use. The ground working devices 17 each include a shank 18 having substantially straight beam portions 19 extending in the direction of travel of the plow and which are suitably connected with the transverse beam, for example, with the clamps as disclosed in United States Letters Patent No. 2,507,783, issued to me on May 16, 1950. The rear ends of the shanks curve downwardly and forwardly as shown at 20 for mounting ground working blades 21. The blades 21 are curved to seat within the curvature of the arms and have sharpened ends 22. The shanks, when attached to their respective beams of the frame, position the ground working tools in transverse rows as shown in Fig. 2 to space the furrows A relatively close together and to provide the intermediate ridges B. The shanks 18 are preferably formed of resilient material to produce vibratory or pumping action when the plow is in use.

With the structure thus far described, the sharpened ends of the blades 21 of the ground working tools enter the ground upon lowering of the frame of the plow and when the plow is drawn by the tractor, the tools heave and break the soil to form the alternate furrows A and ridges B. The clods and soil removed from the furrows are displaced onto the ridges and the excess rolls into the bottoms of the furrows as shown in Fig. 6, so that the exposed surfaces are composed of clods, straw and other loose mulching material normally occurring on a field; whereas the fine dirt, by classifying action, comes to rest beneath and between the clods and coarse material, thus obviating being blown by wind.

The resilient action of the shanks 18 which carry the ground working blades 21 provide a vibratory or pumping action which forms a series or pockets C in the bottoms of the furrows as shown in Fig. 7 for collecting and retaining moisture that is fed upwardly through the loose material as needed by the crop.

Since the soil of the ridges B is unworked any weeds as indicated at D are merely covered by the loose material E (Fig. 6) with the result that the weeds continue to grow and the capillaries in the furrows tend to conduct moisture from the pockets upwardly into the loose material E on the top of the ridges B.

It is the purpose of the present invention to provide weed cutting devices for the shanks 18 and which are adapted to cut through the ridges B in a somewhat chopping action to sever the stems of the weeds from the roots and to cut off and pack the capillaries so as to suspend the capillary action that removes moisture from the pockets of the furrows.

Each weed cutting device includes a bracket 23 having an arcuate plate portion 24 engaging the rear face of the curved portions of the tool carrying shanks and which is secured thereto by fastening devices such as bolts 25 which may also be used for attaching the ground working blades 21 previously described. Extending rearwardly from the arcuate plate portions are wings 26 having pairs of openings 27 positioned at different elevations as best shown in Fig. 8. The openings of each pair of openings are arranged in equally spaced rows extending at substantially the same angle as the curved portion of the shanks to which the mounting brackets are attached and the openings in one row are staggered with respect to the openings in the other row. Mounted on the respective sides of each wing 26 are weed cutting blades 28 and 29. Each blade includes a substantially elongated, plate-like body 30 having the front edges provided with bevels 31 to form cutting edges 32 that extend parallel with the rear edges 33 of the blades. The blades are arranged in V-shaped formation and extend laterally and rearwardly from the wings of the mounting brackets. The front ends of the blades are, therefore, at an angle with respect to the cutting edges so that they may be closely mounted on the sides of the wings. The rear ends of the blades may be of any shape but are shown as extending in parallel relation with the beams of the plow frame.

Extending across the upper face at the forward or converging ends of the blades are angle-shaped brackets 34 and 35 that are best shown in Figs. 4, 5, 8 and 9. Each bracket includes a lateral flange 36 having a shoulder lower face 37 to provide a backing rib 38 for the forward ends of the blades and the flanges have openings 39 registering with openings 40 in the blades for passing fastening devices such as bolts or the like 41 by which the blades are secured to the flanges. The angle brackets also include vertical flanges 42 somewhat thicker than the flanges 36 and which have substantially flat inner faces 43 relieved at the upper and lower edges as indicated at 44 and 45 to permit universal adjustment of the brackets on the wings as later described.

The faces 43 have concave recesses 46 that are of partial spherical shape to accommodate disks 47 that have convex outer faces 48 engaging in the recesses as shown in Fig. 5. The disks 47 have their opposite sides flattened as indicated at 49 to engage the side faces of the wings 26. The disks 47 are of larger diameter and are thicker than the corresponding dimensions of the recesses so that the surrounding faces of the brackets are spaced from the surrounding side faces of the wing 26. To support the disks 47, the peripheries thereof are provided with diametrically opposed elongated notches 50 and 51 that are adapted to register with openings 52 and 53 in the flanges 42 and with any one of a pair of openings 27 in the wings 26 of the mounting brackets 23. Since the holes of each pair of openings are staggered as best shown in Fig. 8, the openings in the flanges 42 are correspondingly staggered so that the knife blades are disposed somewhat horizontally but are adapted to be moved to different angles so that the rear ends of the blades may be positioned at a higher level than the forward ends and that the blades may be tipped downwardly in the direction of the cutting edges to facilitate the vibratory action of the ground working tools and to provide a chopping cut on the weeds as later described.

The brackets are retained in adjusted position by fastening devices such as bolts 54 and 55 that are extended through the openings in the flanges 42 through the notches 50 and 51 in the periphery of the disk and through any one of the pair of openings 27 of the wings 26 as best shown in Fig. 5. The shanks 56 of the bolts are of smaller diameter than the openings so as to allow adjustment of the blade brackets 34 on the disks 47. Lock washers 57 are preferably inserted between the heads of the bolts and the flange 42 of one of the blade brackets and between the flange 42 of the other blade bracket and the nuts of the bolts as best shown in Fig. 4.

With this arrangement, it is obvious that the angularity of the blades with respect to the forward travel of the machine may be adjusted to vary the spread of the rear ends of the blades and the angular position of the blades may be adjusted both in longitudinal and transverse directions so that the cutting edges of the blades are presented to the soil upon vibratory action of the tool supporting shanks to present chopping cuts longitudinally of the ridges as the plow is moved over the field.

In using the plow, the plow is drawn over the field, and the pointed ends of the tool blades 21 work into the ground to form the furrows A and the loosened soil breaks over and is piled onto the tops of the ridges B from where the surplus rolls back into the bottoms of the furrows on the retracting sides of the tools. Simultaneously with this action the knife blades cut along the ridges B from opposite sides thereof so as to sever the stems of the weeds that remain in position on the ridges at a point slightly above the roots as best shown in Fig. 6. The vibratory action resulting from the resiliency of the shanks and resistance of the ground working tools to movement through the soil, produces a series of pockets C in the bottom of the furrows for collecting and storing moisture. This action is also reflected in the knife blades and causes a substantially chopping slicing movement of the blades on the weeds to assure severance thereof. The blades are so adjusted that they cut just below the top of the undisturbed soil of the ridges B and the cutting edges are directed forwardly and downwardly so as to relieve draft on the plow and produce the chopping cuts incidental to vibratory action. The blades in cutting through the soil cut the capillaries that normally conduct moisture from the pockets C and pack the surfaces on the respective sides of the cuts to stop conduction of moisture into the loose soil on the tops of the ridges. The blades are also preferably adjusted so that the rear ends are at a higher level than the front ends to further reduce the draft on the plow and promote cutting action of the blades. The blades are also adjusted vertically to conform with the plowing depth by applying the bolts in any one of the pairs of openings as shown in Fig. 8.

From the foregoing it is obvious that I have provided a weed cutting attachment which overcomes the difficulties of the weed cutting attachment of the above mentioned patent and in which the blades are adapted to be adjusted to any desired angle to conform with the ground conditions under which the plow is used.

What I claim and desire to secure by Letters Patent is:

1. A weed cutting attachment for plows including a bracket having a plate attaching portion adapted for connection with a plow shank, a wing extending rearwardly from the plate attaching portion and having substantially flat side faces, said wing having spaced apart parallel rows of transverse openings with openings in one row related with openings of the other row for forming pairs of openings, blade carrying brackets at respective sides of said wing and having flat side faces, each of said blade carrying brackets being provided with a pair of openings arranged therein to register with any pair of openings in said wing and having a concavity located between the pair of openings in said blade carrying brackets, disk members having convex sides engaging in said concavities, said disk members being thicker than the depth of the concavities to space the surrounding faces of the blade carrying brackets from the faces of said wing to allow for angular adjustment of the blade carrying brackets on said wing, and fastening devices extending through said registering openings of the blade carrying brackets and wing to retain the blade carrying brackets in adjusted position.

2. A weed cutting attachment for plows including a bracket having a plate attaching portion adapted for connection with a plow shank, a wing extending rearwardly from the plate attaching portion and having substantially flat side faces, said wing having spaced apart parallel rows of transverse openings with openings in one row related with openings of the other row for forming pairs of openings, blade carrying brackets at respective sides of said wing and having flat side faces, each of said blade carrying brackets being provided with a pair of openings arranged therein to register with any pair of openings in said wing and having a concavity located between the pair of openings in said blade carrying brackets, disk members having convex sides engaging in said concavities, said disk members being thicker than the depth of the concavities to space the surrounding faces of the blade carrying brackets from the faces of said wing to allow for angular adjustment of the blade carrying brackets on said wing, and fastening devices extending through said registering openings of the blade carrying brackets and wing to retain the blade carrying brackets in adjusted position, said blade attaching brackets having outwardly and downwardly diverging flanges, and outwardly and rearwardly diverging blades attached to said flanges.

3. A weed cutting attachment for plows including a bracket having a plate attaching portion adapted for connection with a plow shank, a wing extending rearwardly from the plate attaching portion and having substantially flat side faces, said wing having spaced apart parallel rows of transverse openings with openings in one row related with openings of the other row for forming pairs of openings, blade carrying brackets at respective sides of said wing and having flat side faces, each of said blade carrying brackets being provided with a pair of openings arranged therein to register with any pair of openings in said wing and having a concavity located between the pairs of openings in said blade carrying brackets, disk members having convex sides engaging in said concavities, said disk members being thicker than the depth of the concavities to space the surrounding faces of the blade carrying brackets from the faces of said wing to allow for angular adjustment of the blade carrying brackets on said wing, said disk members having elongated notches in opposite diametrical sides and adapted to register with the registering openings in the wing and blade carrying brackets for accommodating independent adjustment of the disk members against the side faces of the wing while said blade attaching brackets are adjustable on said convex sides of the disk members, and fastening devices extending through said registering openings and notches to retain said blade carrying brackets and disk members in adjusted position.

WILLIAM T. GRAHAM.

REFERENCES CITED

The following references are of record in the file of this patent:

UNITED STATES PATENTS

| Number | Name | Date |
|---|---|---|
| 118,362 | Hamilton | Aug. 22, 1871 |
| 578,849 | Alexander | Mar. 16, 1897 |
| 602,278 | Woodward | Apr. 12, 1898 |
| 736,320 | Walter | Aug. 11, 1903 |
| 752,570 | Luttrell | Feb. 16, 1904 |
| 1,087,270 | Boldin | Feb. 17, 1914 |
| 1,567,964 | McCasland | Dec. 29, 1925 |
| 2,041,616 | Noell et al. | May 19, 1936 |
| 2,080,723 | Lindgren | May 18, 1937 |
| 2,082,163 | Jeoffroy | June 1, 1937 |
| 2,333,371 | Graham | Nov. 2, 1943 |

FOREIGN PATENTS

| Number | Country | Date |
|---|---|---|
| 518,123 | France | Dec. 27, 1920 |